US012764421B2

(12) United States Patent
Yamamoto

(10) Patent No.: US 12,764,421 B2
(45) Date of Patent: Oct. 13, 2026

(54) CONTROL APPARATUS, ROTATIONALLY DRIVING APPARATUS, CONTROL METHOD, AND STORAGE MEDIUM

(71) Applicant: CANON KABUSHIKI KAISHA, Tokyo (JP)

(72) Inventor: Yasufumi Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 487 days.

(21) Appl. No.: 18/467,877

(22) Filed: Sep. 15, 2023

(65) Prior Publication Data

US 2024/0126044 A1 Apr. 18, 2024

(30) Foreign Application Priority Data

Oct. 13, 2022 (JP) ................................ 2022-164423

(51) Int. Cl.

| | |
|---|---|
| ***H04N 23/695*** | (2023.01) |
| ***F16M 11/12*** | (2006.01) |
| ***G03B 5/06*** | (2021.01) |
| ***G03B 17/02*** | (2021.01) |
| ***G03B 17/56*** | (2021.01) |

(52) U.S. Cl.

CPC ......... *H04N 23/695* (2023.01); *F16M 11/123* (2013.01); *F16M 11/126* (2013.01); *G03B 5/06* (2013.01); *G03B 17/02* (2013.01); *G03B 17/561* (2013.01)

(58) Field of Classification Search

CPC .... H04N 23/695; G03B 17/561; G03B 17/02; G03B 5/06; F16M 11/123; F16M 11/12; F16M 11/126

See application file for complete search history.

(56) References Cited

U.S. PATENT DOCUMENTS

2021/0176399 A1* 6/2021 Byon .................. H04N 23/695
2023/0349507 A1* 11/2023 Liu ....................... H04N 23/60

FOREIGN PATENT DOCUMENTS

JP 2019-022201 A 2/2019

* cited by examiner

*Primary Examiner* — Nicholas G Giles
(74) *Attorney, Agent, or Firm* — Cowan, Liebowitz & Latman, P.C.

(57) ABSTRACT

A control apparatus is configured to control a rotationally driving apparatus that includes a rotationally driving unit configured to rotate a movable unit including an optical system relative to a support unit. The control apparatus includes a memory storing instructions, and a processor configured to execute the instructions to acquire an optical state of the optical system, determine a driving range based on a margin angle and a rotation angle which is an angle from an initial position to a position where the movable unit interferes with the support unit, and control the rotationally driving unit using the driving range. The margin angle is changed according to the optical state.

12 Claims, 7 Drawing Sheets

CONTROL APPARATUS, ROTATIONALLY DRIVING APPARATUS, CONTROL METHOD, AND STORAGE MEDIUM

BACKGROUND

Technical Field

One of the aspects of the embodiments relates to a control apparatus, a rotationally driving apparatus, a control method, and a storage medium.

Description of Related Art

In a rotationally driving apparatus with a gimbal structure that can change an optical state of an optical system, the outer shape of the optical system changes according to a change in the optical state, and thus a movable unit and a support unit easily collide during rotational driving. Japanese Patent Laid-Open No. 2019-22201 discloses a configuration that changes a rotation control range of a rotation mechanism according to an attachment state when the rotation mechanism for rotatably holding an image pickup apparatus is attached to the support unit and the zoom state of the optical system.

In a case where the zoom state changes, not only the outer shape of the optical system but also the center of gravity position and moment of inertia of the movable unit change, and the ease to shake due to disturbance vibration transmitted from the hand of the user of the rotationally driving apparatus changes. The configuration disclosed in Japanese Patent Laid-Open No. 2019-22201 does not consider the ease to shake due to the disturbance vibration, and thus the movable unit collides with the support unit especially at the end of the rotation control range due to the disturbance vibration.

SUMMARY

A control apparatus according to one aspect of the embodiment is configured to control a rotationally driving apparatus that includes a rotationally driving unit configured to rotate a movable unit including an optical system relative to a support unit. The control apparatus includes a memory storing instructions, and a processor configured to execute the instructions to acquire an optical state of the optical system, determine a driving range based on a margin angle and a rotation angle which is an angle from an initial position to a position where the movable unit interferes with the support unit, and control the rotationally driving unit using the driving range. The margin angle is changed according to the optical state. A rotationally driving apparatus including the above control apparatus and a control method corresponding to the above control apparatus also constitute another aspect of the embodiment. A storage medium storing a program that causes a computer to execute the above control method also constitutes another aspect of the embodiment.

Further features of the disclosure will become apparent from the following description of embodiments with reference to the attached drawings.

DESCRIPTION OF THE EMBODIMENTS

Figure 1:
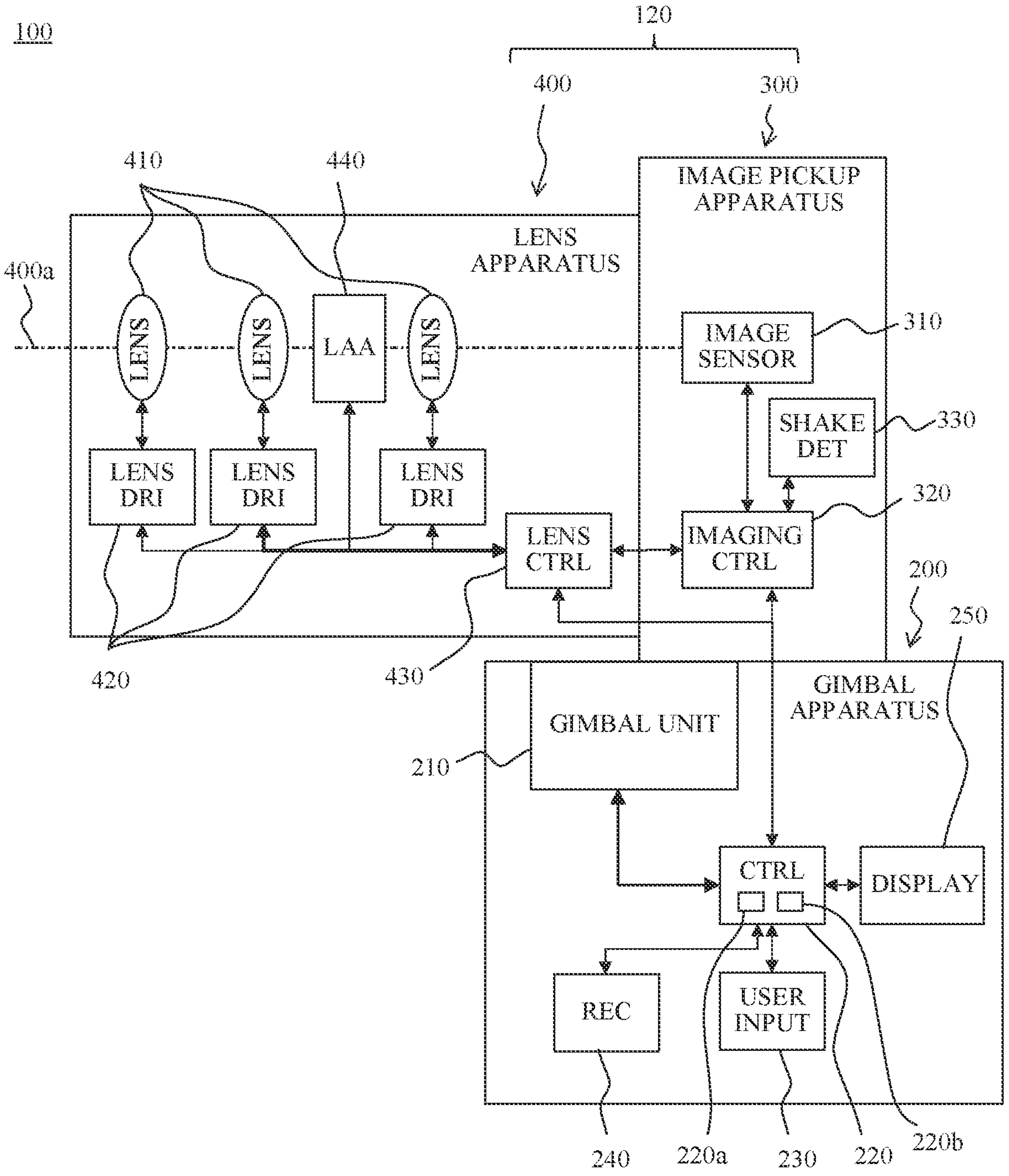
FIG. 1 illustrates a system configuration of a rotationally driving apparatus according to one embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 illustrates a system configuration of a rotationally driving apparatus 100 according to this embodiment. The rotationally driving apparatus 100 includes a gimbal apparatus 200, an image pickup apparatus 300, and a lens apparatus (optical system) 400. A movable unit 120 includes the image pickup apparatus 300 and the lens apparatus 400. The gimbal apparatus 200, the image pickup apparatus 300, and the lens apparatus 400 may be integrated with one another or attachable to and detachable from one another. The rotationally driving apparatus 100 further includes an unillustrated microphone to acquire a voice. The microphone may be provided in any of the gimbal apparatus 200, the image pickup apparatus 300, and the lens apparatus 400.

The gimbal apparatus 200 includes a gimbal unit (rotationally driving unit) 210, a control unit (control apparatus) 220, a user input unit 230, a recorder 240, and a display unit 250, and performs image stabilization driving and panning driving. The gimbal unit 210 changes the orientation of the movable unit 120. The control unit 220 controls the gimbal unit 210. The control unit 220 accepts user input through the user input unit 230. The user input is reflected in the control of the gimbal unit 210. The control unit 220 communicates with an imaging control unit 320 and receives images acquired by an image sensor 310. The images to be received are still images and moving images and are recorded in the recorder 240. The display unit 250 displays an image sent from control unit 220. The control unit 220 communicates with the imaging control unit 320 and a lens control unit 430, receives the statuses of the gimbal apparatus 200, the image pickup apparatus 300, and the lens apparatus 400, and displays these statuses on the display unit 250. The control unit 220 includes an acquiring unit 220*a* and a driving control unit 220*b*. The acquiring unit 220*a* acquires the optical state of the lens apparatus 400. The driving control unit 220*b* determines a driving range based on a rotation angle which is an angle from the initial position to a position where the movable unit 120 interferes with a grip portion 110 and a margin angle. The margin angle is an angle difference provided to prevent the movable unit 120 from interfering with the grip portion 110 in a case where the movable unit 120 is vibrated and is changed according to the optical state of the lens apparatus 400. The driving control unit 220*b* controls the gimbal unit 210 using the determined driving range. The lens control unit 430 and the imaging control unit 320 may have the functions of the acquiring unit 220*a* and the driving control unit 220*b*.

The image pickup apparatus 300 includes the image sensor (imaging unit) 310 that acquires an image through the lens apparatus 400, an imaging control unit 320 that controls the image sensor 310, and a shake detector 330 that detects vibration such as angular velocity and acceleration of the movable unit 120. The imaging control unit 320 communicates with the control unit 220 and transmits information on the image pickup apparatus 300 including images acquired by the image sensor 310. The imaging control unit 320 communicates with the lens control unit 430 and exchanges information on the image pickup apparatus 300. The image pickup apparatus 300 may include an image stabilization unit that performs an image stabilization operation by moving the image sensor 310 relative to (in a direction with a directional component orthogonal to) the optical axis 400*a* of the lens apparatus 400.

The lens apparatus 400 includes a lens (optical element) 410, a lens driving unit 420 that moves the lens, a lens control unit 430 that controls the lens driving unit 420, and a light amount adjustment unit (LAA) 440 that is controlled by the lens control unit 430. By moving the lens 410 back and forth relative to the optical axis 400*a*, the lens driving unit 420 can change the optical state of the lens apparatus 400, such as the zoom state, which is a focal length state, and a focus state, which is a focal position state. The rotationally driving apparatus 100 according to this embodiment can handle changes in the position of the center of gravity and the moment of inertia of the movable unit 120 along with changes in the optical state of the lens apparatus 400. The lens driving unit 420 may perform an image stabilization operation by moving the lens 410 relative to the optical axis 400*a*.

Figure 2A:
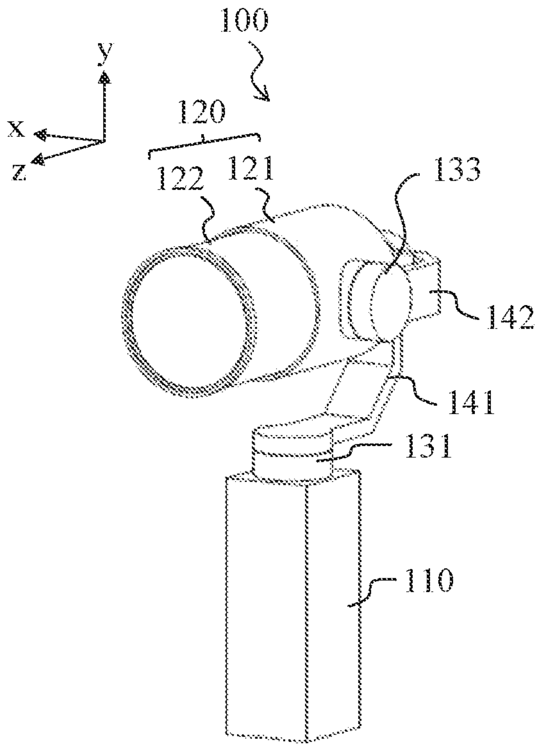
FIGS. 2A and 2B illustrate the appearance of the rotationally driving apparatus.
Figure 2B:
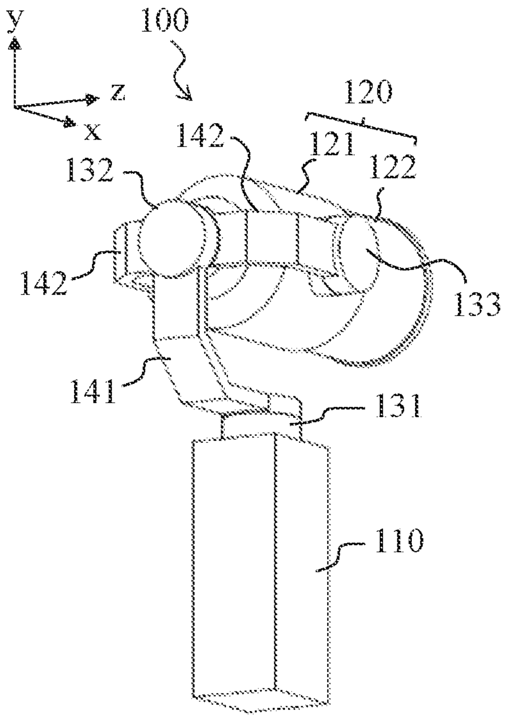

FIGS. 2A and 2B illustrate the appearance of the rotationally driving apparatus 100. FIG. 2A is a front perspective view of the rotationally driving apparatus 100. FIG. 2B is a rear perspective view of the rotationally driving apparatus 100. The grip portion (support unit) 110 is provided in the gimbal apparatus 200 and includes the control unit 220, the user input unit 230, the recorder 240, and the display unit 250. The movable unit 120 includes a connector 121 with the gimbal unit 210 and a retractable unit 122 that moves back and forth as the optical state of the lens apparatus 400 changes.

The gimbal apparatus 200 can be driven on three axes by the gimbal unit 210. The gimbal unit 210 includes a pan driving unit 131, a roll driving unit 132, a tilt driving unit 133, a first arm 141, and a second arm 142. The pan driving unit 131 drives the movable unit 120 around the y-axis. The roll driving unit 132 drives the movable unit 120 around the z-axis. The tilt driving unit 133 drives the movable unit 120 around the x-axis. The first arm 141 connects the pan driving unit 131 and the roll driving unit 132. The second arm 142 connects the roll driving unit 132 and the tilt driving unit 133.

Although the rotation axis of each driving unit has been described in relation to the xyz-axes illustrated in FIG. 2, a relative relationship of the rotation axes of the driving units changes. For example, in a case where the movable unit 120 rotates 90 degrees in the roll direction, the rotation axis of the tilt driving unit 133 changes to the y-axis.

A description will now be given of the image stabilization operation of the rotationally driving apparatus 100. The rotationally driving apparatus 100 is held by the user's hand at the grip portion 110, and tilts according to the tilt of the user's hand. The vibration of the gripping hand and the vibration of the user as a whole due to the user's motion such as walking are transmitted to the rotationally driving apparatus 100 via the hand. Thereby, the image acquired by the image sensor 310 is tilted or blurred.

In this embodiment, the rotationally driving apparatus 100 controls the spatial orientation of the movable unit 120 by means of the pan driving unit 131, the roll driving unit 132, and the tilt driving unit 133, in order to restrain an image acquired by the image sensor 310 from tilting and blurring. For example, the spatial orientation of the movable unit 120 is controlled so that the image is always horizontal regardless of the tilt of the user's hand, and the image is controlled so that the image is stabilized regardless of the vibration transmitted from the user's hand. This embodiment will refer to the operation of restraining an image from tilting and blurring as an image stabilization operation. As described above, apart from the image stabilization operation by the pan driving unit 131, roll driving unit 132, and tilt driving unit 133, the image stabilization operation may be performed by the image stabilization units provided to the lens driving unit 420 and the image pickup apparatus 300.

A description will now be given of the panning operation of the rotationally driving apparatus 100. Since the rotationally driving apparatus 100 can control the spatial orientation of the movable unit 120 through pan driving, tilt driving, and roll driving, an image acquired by the image sensor 310 can be set to a desired angle of view. For example, the pan driving unit 131 is driven based on user input to change the spatial orientation of the movable unit 120 in the pan direction, thereby changing the angle of view acquired by the image sensor 310 in the pan direction. Similarly, the angle of view is changed with respect to tilt and roll directions. The pan, tilt, and roll orientations of the movable unit 120 are changed with respect to the three axes so as to track a specific object based on the image acquired by the image sensor 310.

Figure 3:
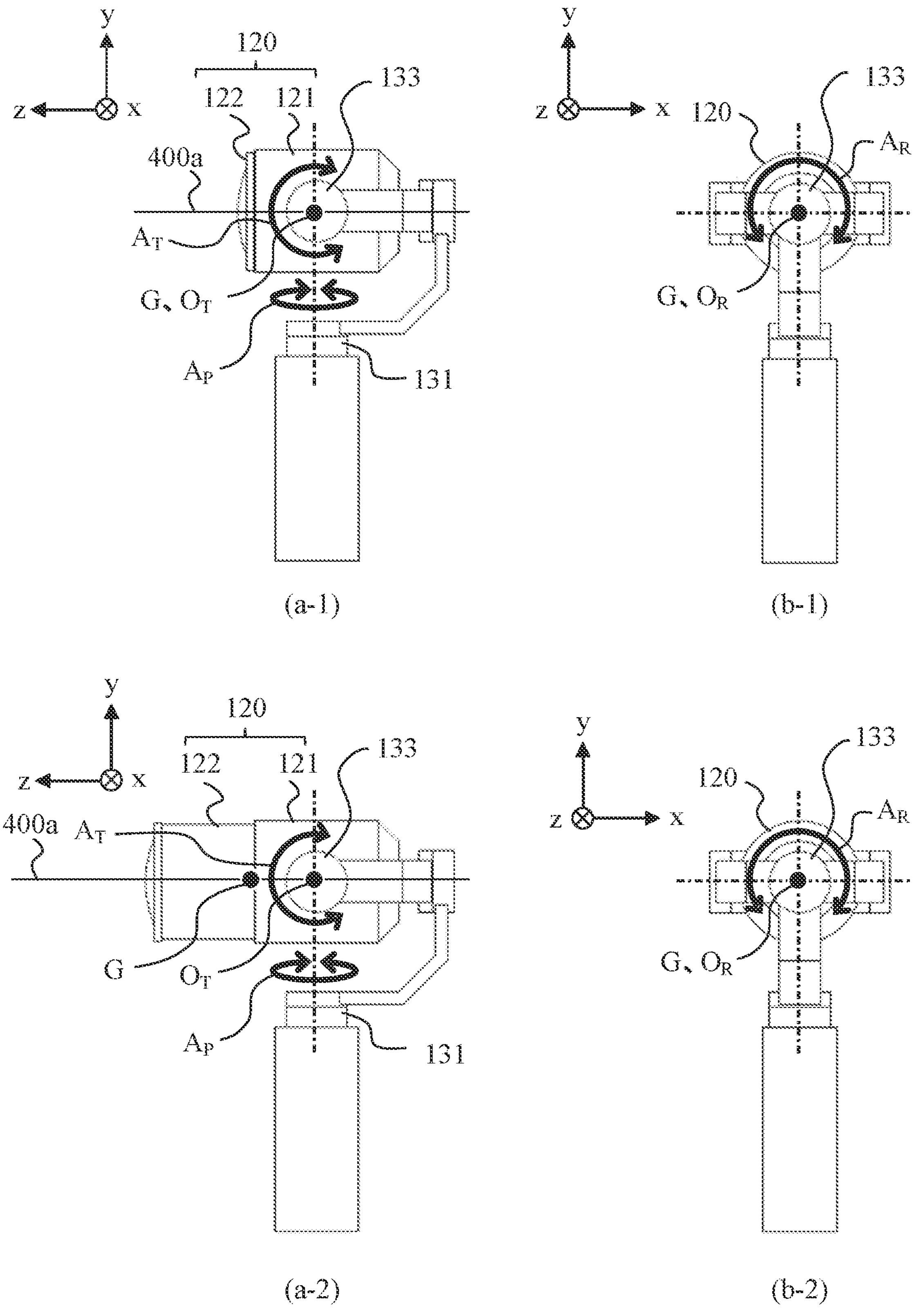
FIG. 3 illustrates changes in a position of a center of gravity and the moment of inertia of a movable unit.

FIG. 3 illustrates changes in the position of the center of gravity and the moment of inertia of the movable unit 120. In FIG. 3, (a-1) and (b-1) illustrate the rotationally driving apparatus 100 in a case where the zoom state of the lens apparatus 400 is on the wide-angle side. (a-1) illustrates the rotationally driving apparatus 100 viewed from the x-axis direction. (b-1) illustrates the rotationally driving apparatus 100 viewed from the z-axis direction. (a-2) and (b-2) illustrate the rotationally driving apparatus 100 in a case where the zoom state of the lens apparatus 400 is on the telephoto side. (a-2) illustrates the rotationally driving apparatus 100 viewed from the x-axis direction. (b-2) illustrates the rotationally driving apparatus 100 viewed from the z-axis direction.

In (a-1) and (b-1), the retractable unit 122 is retracted toward the negative side in the z-axis direction, and the outer shape of the movable unit 120 in the z-axis direction is relatively short. In this state, a center of gravity position G of the movable unit 120 is close to and substantially coincides with a rotation center position $O_T$ in a tilt direction $A_T$ in the z-axis direction. In addition, the center of gravity position G is close to an unillustrated rotation center position $O_P$ in the panning direction $A_P$ in the z-axis direction. As illustrated in (b-1), the center of gravity position G is close to a rotation center position $O_R$ in a roll direction A R in the x-axis direction and the y-axis direction.

Now consider the moment of inertia of the movable unit 120. As described above, the center of gravity position G of the movable unit 120 is close to the rotation center positions $O_P$, $O_T$, and $O_R$ in the pan, tilt, and roll directions, respectively. Thus, the moment of inertia in a case where the movable unit 120 is considered to be a mass point existing at the center of gravity position G is extremely small. In a case where the movable unit 120 is considered to be an object with mass distribution, the outer shape of the movable unit 120 around the pan axis and tilt axis orthogonal to the z-axis is short, and the moment of inertia of the movable unit 120 around the pan axis and tilt axis is smaller than that in a case where the zoom is on the telephoto side. Since the outer shape of the movable unit 120 around the roll axis is constant regardless of the zoom state, there is no change in the moment of inertia between the zoom state on the wide-angle side and the zoom state on the telephoto side.

In (a-2) and (b-2), the retractable unit 122 is extended toward the positive side in the z-axis direction, and the outer shape of the movable unit 120 in the z-axis direction is relatively long. In this state, the center of gravity position G of the movable unit 120 is distant from the rotation center position $O_T$ in the tilt direction A T on the plus side in the z-axis direction. The center of gravity position G is distant from the rotation center position $O_P$ in the panning direction $A_P$ on the positive side in the z-axis direction. In (a-2) and (b-2), a distance between the center of gravity position G of the movable unit 120 and the rotation center position $O_T$ in the tilt direction $A_T$, and a distance between the center of gravity position G and the rotation center position $O_P$ in the panning direction $A_P$ are longer in the z-axis direction than those of (a-1) and (b-1). Moreover, in (b-1), the center of gravity position G is close to the rotation center position $O_R$ in the roll direction $A_R$ in the x-axis direction and the y-axis direction.

Now consider the moment of inertia of the movable unit 120. As described above, the center of gravity position G of the movable unit 120 is distant from the rotation center positions $O_P$ and $O_T$ in the pan and tilt directions in the z-axis direction. Therefore, the moment of inertia in a case where the movable unit 120 is considered to be a mass point existing at the center of gravity position G is larger than that in a case where the zoom state is on the wide-angle side. In a case where the movable unit 120 is considered to be an object with mass distribution, the outer shape of the movable unit 120 around the pan axis and the tilt axis orthogonal to the z-axis is long, and the moment of inertia of the movable unit 120 around the pan axis and the tilt axis is larger than that in a case where the zoom state is on the wide-angle side.

Figure 4:
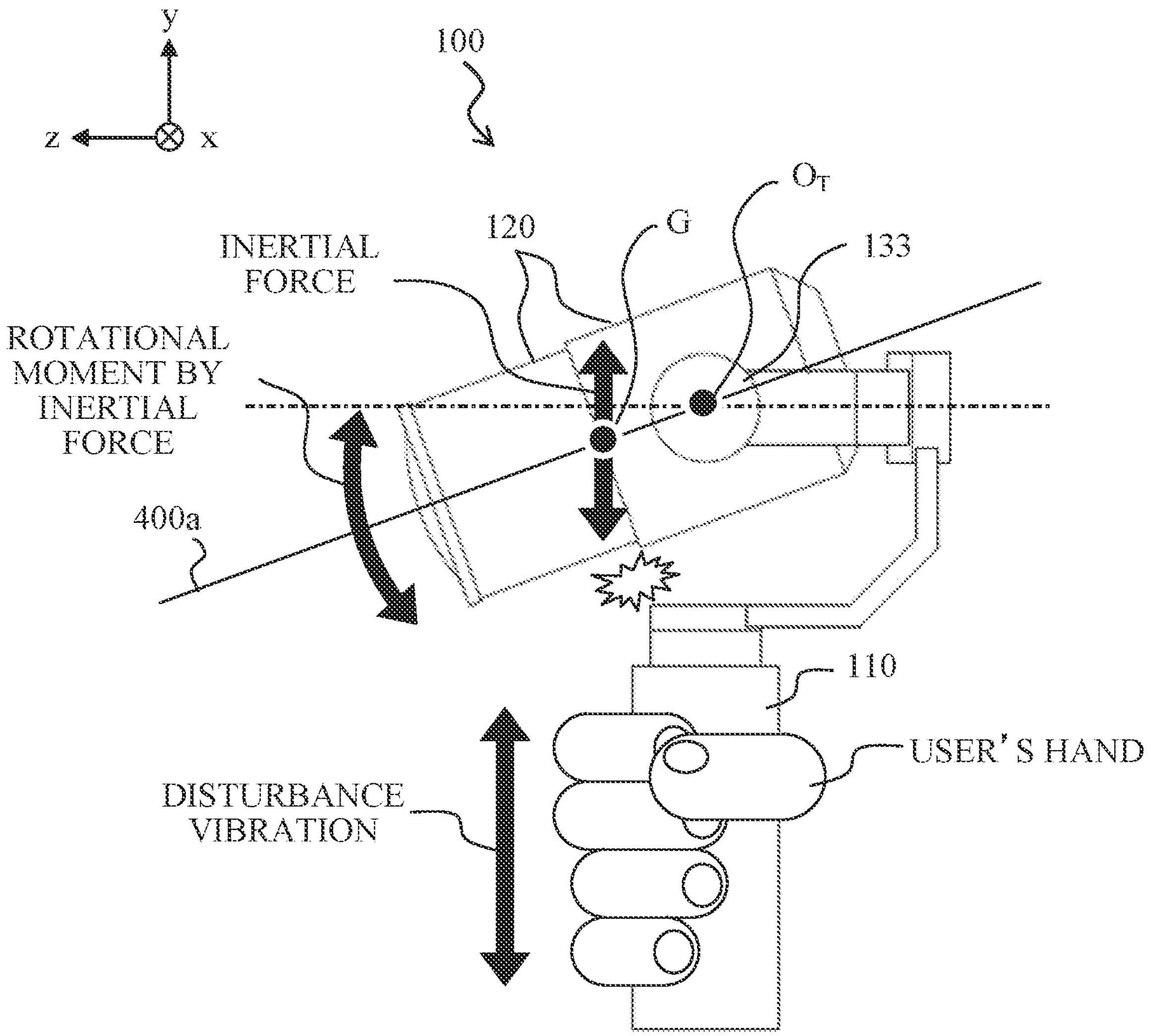
FIG. 4 explains the influence of disturbance vibration.

Referring now to FIG. 4, a description will be given of the influence of disturbance vibration for each optical state of the lens apparatus 400. FIG. 4 explains the influence of disturbance vibration and illustrates a state in which the rotationally driving apparatus 100 is gripped by the user's hand at the grip portion 110. In FIG. 4, the user's hand vibrates, and disturbance vibration in the y-axis direction is transmitted to the rotationally driving apparatus 100. The disturbance vibration is transmitted to the movable unit 120, and inertial force in the y-axis direction acts relatively on the movable unit 120.

As illustrated in FIG. 4, in a case where the center of gravity position G of the movable unit 120 is distant from the rotation center position $O_T$ in the tilt direction $A_T$, a rotational moment due to inertial force acts on the movable unit 120. The movable unit 120 is shaken in the tilt rotation direction by the rotational moment.

In a case where the zoom state illustrated in (a-1) and (b-1) is on the wide-angle side, the center of gravity position G and the rotation center position $O_T$ in the tilt direction $A_T$ are close to each other, and the inertial force acting on the movable unit 120 has no component in the direction of the rotational moment. Therefore, even if disturbance vibration is transmitted to the rotationally driving apparatus 100, the movable unit 120 is not shaken in the tilt rotation direction.

As described above, in a case where the user grips the rotationally driving apparatus 100, the rotational moment that causes the movable unit 120 to shake in the tilt rotation direction changes according to the center of gravity position G of the movable unit 120. In addition, the moment of inertia, which is the difficulty of shake of the movable unit 120, also changes.

As illustrated in (a-1) and (b-1), in a case where the moment of inertia of the movable unit 120 around the pan axis and the tilt axis is small, even a small rotational moment generates a large angular acceleration. On the other hand, as illustrated in (a-2) and (b-2), in a case where the moment of inertia of the movable unit 120 around the pan axis and the tilt axis is large, a large angular acceleration does not occur unless a large rotational moment is applied. In a case where the moment of inertia is large, once the angular velocity around the axis is generated, the torque required to stop the rotation also becomes large.

Figure 5A:
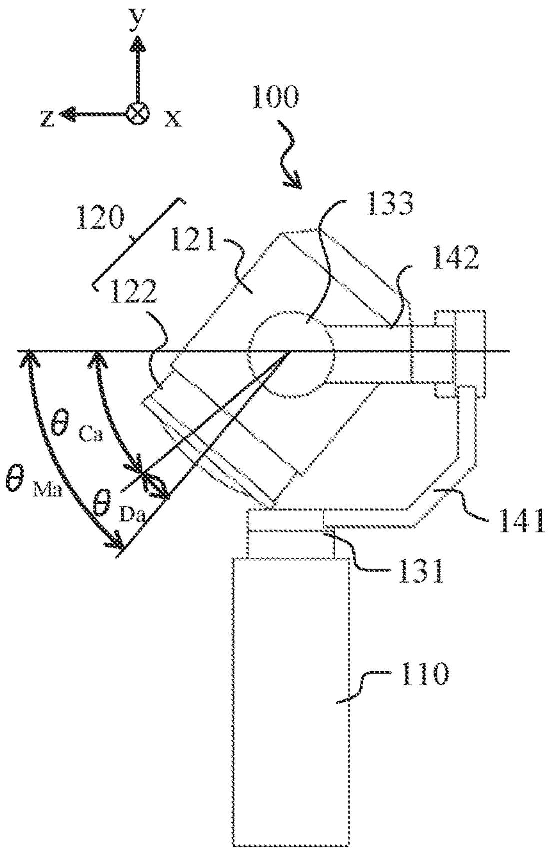
FIGS. 5A and 5B explain control in a case where a rotationally driving range of the rotationally driving apparatus is changed.
Figure 5B:
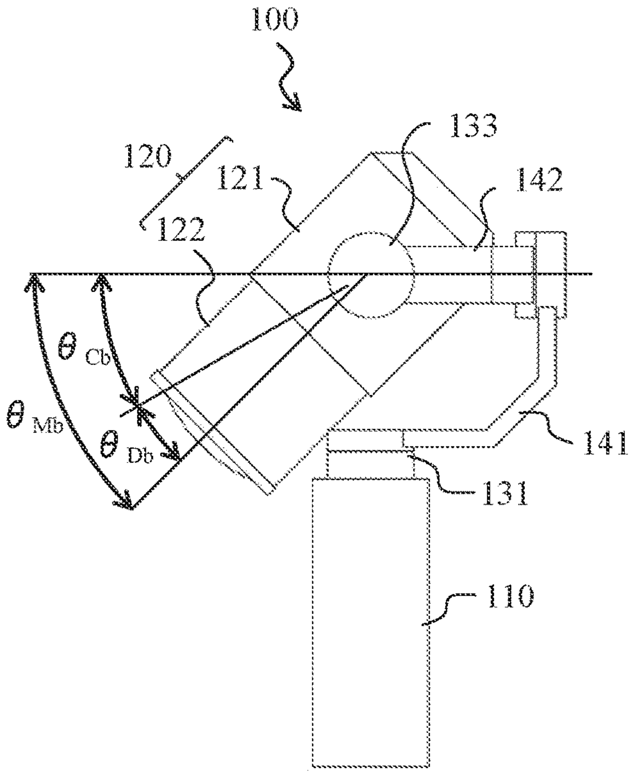

Referring now to FIGS. 5A and 5B, a description will be given of control in a case where the rotationally driving range of the rotationally driving apparatus 100 is changed. FIGS. 5A and 5B explain control in a case where the rotationally driving range of the rotationally driving apparatus 100 is changed. FIG. 5A illustrates the movable unit 120 in a case where the zoom state of the lens apparatus 400 is on the wide-angle side. FIG. 5B illustrates the movable unit 120 in a case where the zoom state of the lens apparatus 400 is on the telephoto side. Sub-numbers "a" and "b" of the reference numbers correspond to the states illustrated in FIGS. 5A and 5B, respectively. In this embodiment, the rotationally driving range is an angle range around the tilt axis.

Now assume tilts with reference to the tilt driving unit 133 and the second arm 142. A clockwise direction in FIGS. 5A and 5B will be referred to as an upward tilt direction, and a counterclockwise direction will be referred to as a downward tilt direction. A rotation angle (mechanical end of tilt) $\theta_M$ is a rotation angle from the initial position to the position where the movable unit 120 physically interferes (collides) with the grip portion 110 and a structure close to the grip portion 110. In a case where the zoom state of the lens apparatus 400 is on the telephoto side, the outer shape of the movable unit 120 is elongated in the direction orthogonal to the x-axis, and the movable unit 120 easily interferes with the grip portion 110. Therefore, the mechanical end of tilt $\theta_{MA}$ in FIG. 5A is larger than the mechanical end of tilt $\theta_{MB}$ in FIG. 5B.

A rotation angle (control end of tilt) $\theta_C$ indicates an end in tilt downward direction set as a rotationally driving range. An angular difference (margin angle) $\theta_D$ is an angular difference between the mechanical end of tilt $\theta_M$ and the control end of tilt $\theta_C$ and is a marginal angle for restraining the movable unit 120 from interfering with the grip portion 110 in a case where the movable unit 120 is shaken by disturbance vibration.

As described above, the way the movable unit 120 is shaken changes depending on the center of gravity position G and the moment of inertia of the movable unit 120. Therefore, this embodiment performs control to increase the angle difference $\theta_D$ in a case where the center of gravity position G of the movable unit 120 is distant from the rotation center position $O_T$ in the tilt direction $A_T$ and the moment of inertia is large. That is, this embodiment performs control to make the marginal angle $\theta_{Db}$ in FIG. 5B larger than the marginal angle $\theta_{Da}$ in FIG. 5A.

This control determines as a driving range the control end of tilt $\theta_C$, which is a difference between the mechanical end of tilt $\theta_M$ and the margin angle $\theta_D$. Thereby, even in a case where the movable unit 120 is shaken in the tilt rotation direction due to disturbance vibration, the tilt driving unit 133 can be driven without interference between the movable unit 120 and the grip portion 110 or the structure adjacent to the grip portion 110.

Figure 6:
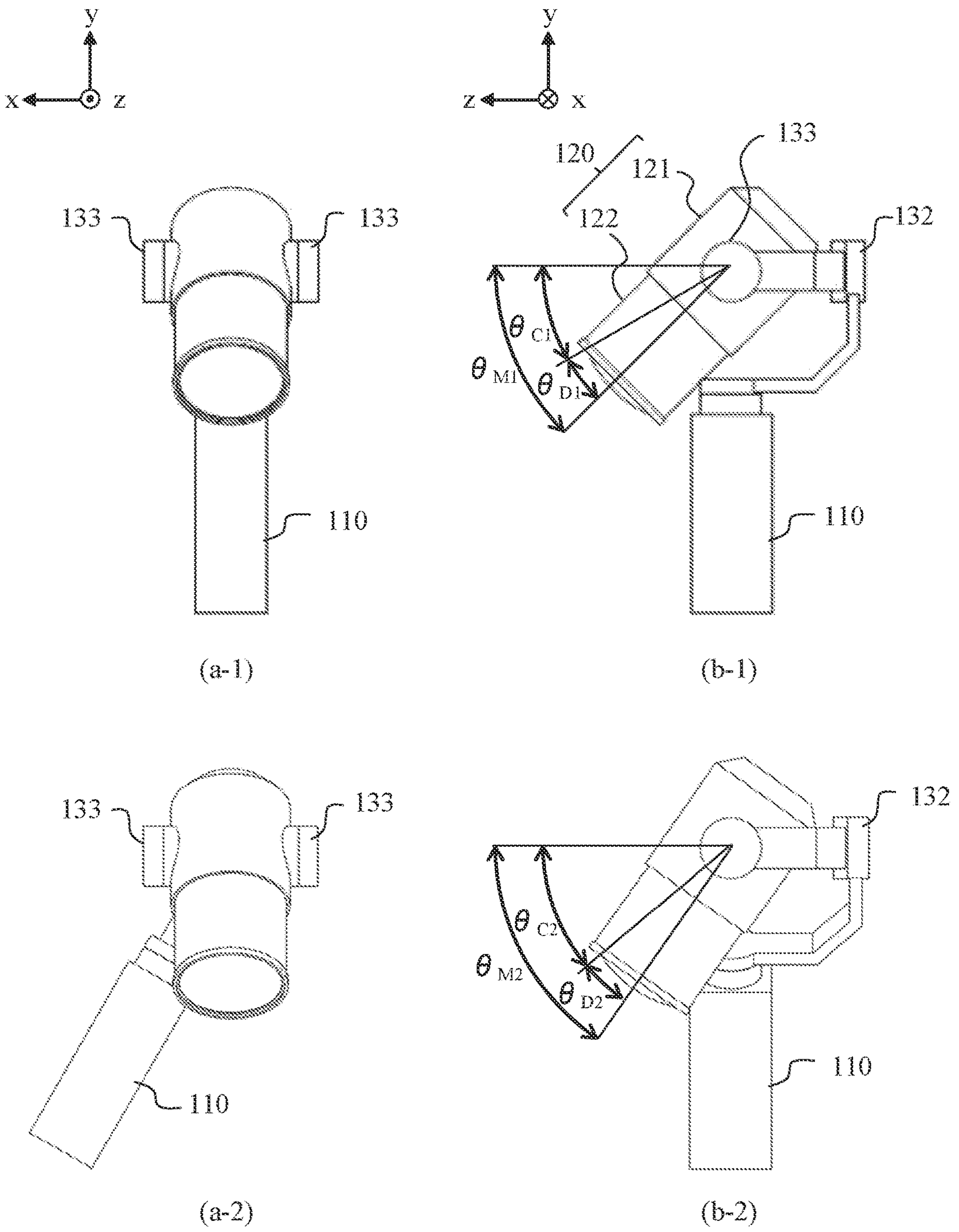
FIG. 6 explains the rotationally driving range according to a roll orientation of the rotationally driving apparatus.

Referring now to FIG. 6, a description will be given of a rotationally driving range according to the roll axis of the rotationally driving apparatus 100 (rotational position of the roll driving unit 132). FIG. 6 explains the rotationally driving range according to the roll axis of the rotationally driving apparatus 100.

In FIG. 6, (a-1) and (b-1) illustrate a state in which the roll axis is approximately parallel to the y-axis direction, which is the vertical direction of the grip portion 110. In this state, the mechanical end of tilt, the control end of tilt, and the margin angle are indicated by $\theta_{M1}$, $\theta_{C1}$, and $\theta_{D1}$, respectively.

(a-2) and (b-2) illustrate a state in which the roll axis is tilted relative to the y-axis direction, which is the vertical direction of the grip portion 110. In this state, the mechanical end of tilt, the control end of tilt, and the margin angle are indicated by $\theta_{M2}$, $\theta_{C2}$, and $\theta_{D2}$, respectively.

Interference between the movable unit 120 and the grip portion 110 occurs in a case where the movable unit 120 rotates in the tilt downward direction because the grip portion 110 is located in the negative y-axis direction, which is the rotation direction. Therefore, as illustrated in (a-2) and (b-2), the grip portion 110 is tilted relative to the y-axis direction, which is the vertical direction, so that the movable unit 120 and the grip portion 110 are less likely to interfere with each other. Therefore, the mechanical end of tilt $\theta_{M2}$ is larger than the mechanical end of tilt $\theta_{M1}$, and interference between the movable unit 120 and the grip portion 110 becomes less likely as the roll axis tilts more relative to the vertical direction. In the rotationally driving apparatus 100, the rotationally driving range is changed in consideration of changes in the mechanical end of tilt $\theta_M$ according to the rotation of the roll shaft. Thereby, interference between the movable unit 120 and the grip portion 110 can be suppressed while the rotationally driving range can be maintained wide according to the rotation of the roll shaft.

Figure 7:
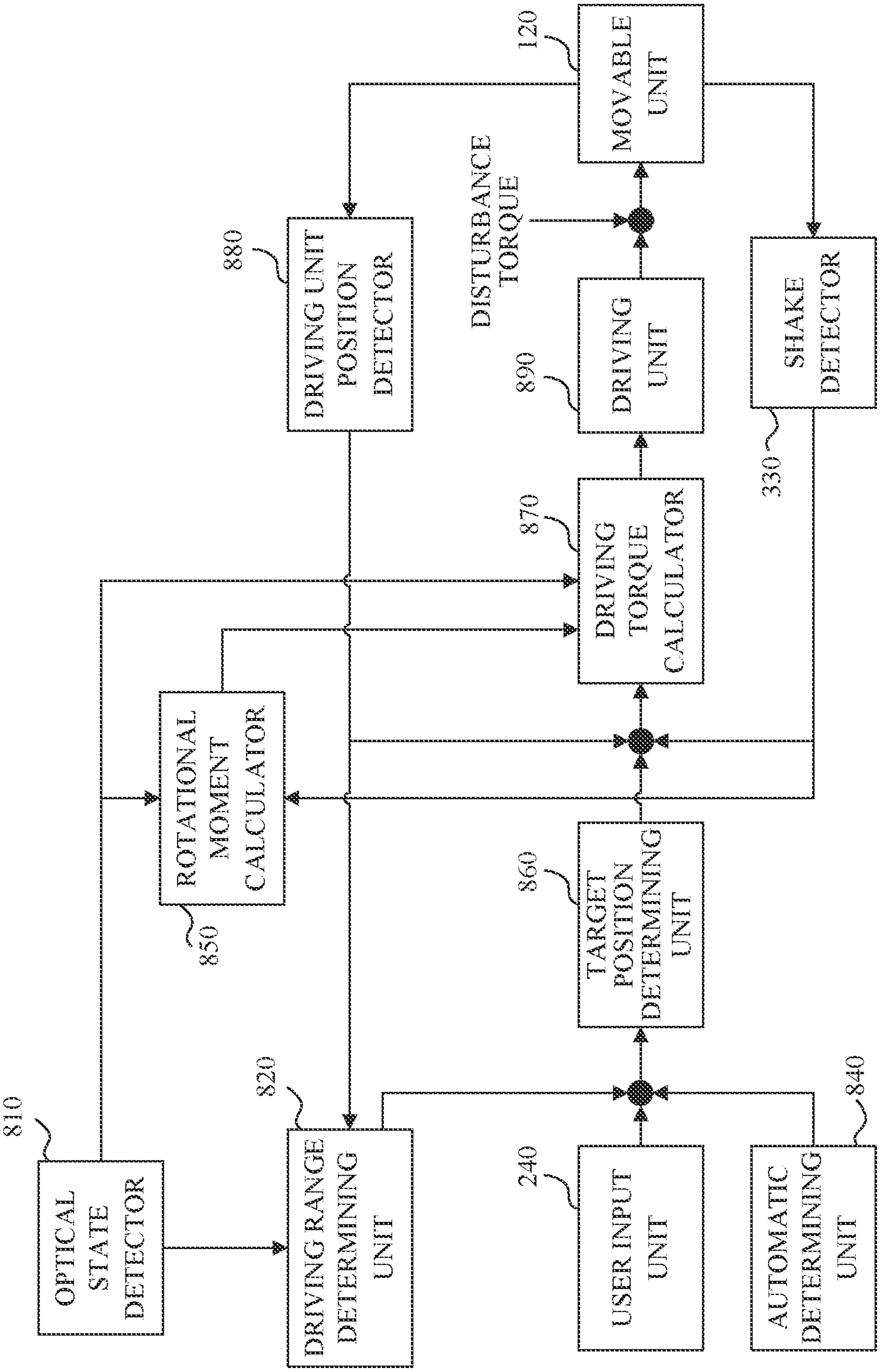
FIG. 7 is a control block diagram illustrating control of the rotationally driving apparatus.

Referring now to FIG. 7, a description will be given of control of the rotationally driving apparatus 100. FIG. 7 is a control block diagram explaining control of the rotationally driving apparatus 100.

A description will now be given of the image stabilization operation. The shake detector 330 detects vibrations such as angular velocity and acceleration of the movable unit 120 as described above. The vibration information detected by shake detector 330 is input to a driving torque calculator 870. In the image stabilization operation, the driving torque calculator 870 calculates the driving torque that cancels the vibration applied to the movable unit 120 detected by the shake detector 330. The driving torque information calculated by the driving torque calculator 870 is input to a driving unit 890. The driving unit 890 includes the pan driving unit 131, the roll driving unit 132, and the tilt driving unit 133. The driving torque output by the driving unit 890 is input to the movable unit 120 together with the disturbance torque, and the position of the movable unit 120 is determined. Here, the disturbance torque refers to a sum of the rotational moment due to the inertial force, the bearing friction in the pan driving unit 131, the roll driving unit 132, and the tilt driving unit 133, and unillustrated torque due to wiring.

A description will now be given of a panning operation. Target position information based on user input is input to a target position determining unit 860. Target position information determined by an automatic determining unit 840 for object tracking based on the image acquired by the image sensor 310 is also input to the target position determining unit 860. The target position determining unit 860 determines a target position for actual driving from the input target position information and inputs the target position information to the driving torque calculator 870. A driving unit position detector 880 detects the position of the movable unit 120 (rotational positions of the pan driving unit 131, the roll driving unit 132, and the tilt driving unit 133). The position information on the movable unit 120 is input into the driving torque calculator 870. The driving torque calculator 870 calculates the required driving torque by comparing the actual position of the movable unit 120 and the target position. As described above, in the image stabilization operation, the driving torque that cancels out the vibration applied to the movable unit 120 is calculated. Therefore, driving torque information that takes into consideration both the driving torque that cancels the vibration and the driving torque that changes the angle of view by panning is input to the driving unit 890.

A description will now be given of an operation for determining the rotationally driving range. As described above, this embodiment performs control based on the position of the center of gravity and the moment of inertia of the movable unit 120 according to the optical state of the lens apparatus 400. An optical state detector 810 detects the center of gravity position G and the moment of inertia of the movable unit 120 according to the optical state of the lens apparatus 400 and sends the detected information to a driving range determining unit 820. As described above, since the rotationally driving range is changed according to the roll axis, the rotation position information of the roll driving unit 132 acquired by the driving unit position detector 880 is also input to the driving range determining unit 820. The driving range determining unit 820 determines the rotationally driving range using the information on the center of gravity position G and the moment of inertia of the movable unit 120 and the information on the rotational position of the roll driving unit 132. Thereby, even when the optical state of the lens apparatus 400 changes, interference between the movable unit 120 and the grip portion 110 due to disturbance vibration can be suppressed.

By further utilizing the center of gravity position G and the moment of inertia of the movable unit 120 detected by the optical state detector 810, controllability can be further improved. As described above, the driving torque calculator 870 receives the vibration information detected by the shake detector 330, the position information of the movable unit 120, and the target position information. The driving torque calculator 870 determines the driving torque using the input information. In addition, the required driving torque must be changed according to the moment of inertia of the movable unit 120 as well as the target position and speed. Hence, information about the moment of inertia of movable unit 120 calculated by a rotational moment calculator 850 using the optical state detected by optical state detector 810 is input to the driving torque calculator 870. The driving torque calculator 870 increases or decreases the output torque according to the input moment of inertia, thereby improving followability to the target position in rotational driving control of the movable unit 120.

As described above, in a case where the center of gravity position G of the movable unit 120 is distant from the rotation center position $O_T$ in the tilt direction $A_T$, a rotational moment due to inertial force is applied to the movable unit 120. The rotational moment due to inertial force is calculated from the center of gravity position G and the moment of inertia of movable unit 120 detected by optical state detector 810 and the acceleration detected by shake detector 330. Therefore, after the shake detector 330 detects the angular velocity generated in the movable unit 120 as a result of the application of the disturbance torque, and before determining the driving torque, the driving torque calculator 870 can calculate the driving torque in anticipation of the rotational moment due to the inertial force. Thereby, control can be facilitated against the rotational moment due to the inertial force in the rotational driving control of the movable unit 120.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

This embodiment can provide a control apparatus that can suppress the collision of a movable unit and a support unit by disturbance vibration.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-164423, filed on Oct. 13, 2022, which is hereby incorporated by reference herein in its entirety.

What is claimed is:

1. A control apparatus configured to control a rotationally driving apparatus that includes a rotationally driving unit configured to rotate a movable unit including an optical system relative to a support unit, the control apparatus comprising:
- a memory storing instructions; and
- a processor configured to execute the instructions to:
- acquire an optical state of the optical system,
- determine a driving range based on a margin angle and a rotation angle which is an angle from an initial position to a position where the movable unit interferes with the support unit, and
- control the rotationally driving unit using the driving range,
- wherein the margin angle is changed according to the optical state,
- wherein the movable unit can change between a first state and a second state according to the optical state,
- wherein a distance between a center of gravity of the movable unit and a rotation center position of the rotationally driving unit when viewed from a direction parallel to a rotation axis of the rotationally driving unit in the second state is longer than that in the first state,
- wherein the margin angle in the first state is smaller than the margin angle in the second state
- wherein the first state is a state in which the center of gravity and the rotation center position coincide with each other when viewed from the direction parallel to the rotation axis, and
- wherein the second state is a state in which the center of gravity is separated from the rotation center position when viewed from the direction parallel to the rotation axis.

2. The control apparatus according to claim 1, wherein the rotation angle in the first state is larger than the rotation angle in the second state.

3. The control apparatus according to claim 1,
- wherein the rotationally driving unit has a first rotation axis and a second rotation axis,
- wherein the driving range is an angle range that has a center on the second rotation axis, and
- wherein the rotation angle changes according to a direction of the first rotation axis.

4. The control apparatus according to claim 1, wherein the driving range is an angle range that has a center on a rotation axis that is orthogonal to a direction parallel to an optical axis of the optical system and a vertical direction.

5. The control apparatus according to claim 1, wherein the driving range is based on a position of a center of gravity and a moment of inertia of the movable unit according to the optical state.

6. The control apparatus according to claim 1, wherein the processor changes followability to a target position in controlling the rotationally driving unit according to the optical state.

7. The control apparatus according to claim 1, wherein the processor changes a driving torque to be generated in the rotationally driving unit based on vibration applied to the movable unit and a position of a center of gravity and a moment of inertia of the movable unit according to the optical state.

8. The control apparatus according to claim 1, wherein the processor determines the driving range based on a difference between the rotation angle and the margin angle.

9. The control apparatus according to claim 1, wherein the movable unit includes an imaging unit.

10. A rotationally driving apparatus comprising:

a control apparatus configured to control the rotationally driving apparatus;

a support unit;

a movable unit including an optical system; and a rotationally driving unit configured to rotate the movable unit relative to the support unit, wherein the control apparatus includes:

a memory storing instructions; and a processor configured to execute the instructions to:

acquire an optical state of the optical system, determine a driving range based on a margin angle and a rotation angle which is an angle from an initial position to a position where the movable unit interferes with the support unit, and control the rotationally driving unit using the driving range, wherein the margin angle is changed according to the optical state wherein the movable unit can change between a first state and a second state according to the optical state, wherein a distance between a center of gravity of the movable unit and a rotation center position of the rotationally driving unit when viewed from a direction parallel to a rotation axis of the rotationally driving unit in the second state is longer than that in the first state, wherein the margin angle in the first state is smaller than the margin angle in the second state, wherein the first state is a state in which the center of gravity and the rotation center position coincide with each other when viewed from the direction parallel to the rotation axis, and wherein the second state is a state in which the center of gravity is separated from the rotation center position when viewed from the direction parallel to the rotation axis.

11. A control method configured to control a rotationally driving apparatus that includes a rotationally driving unit configured to rotate a movable unit including an optical system relative to a support unit, the control method comprising the steps of:

acquiring an optical state of the optical system;

determining a driving range based on a margin angle and a rotation angle which is an angle from an initial position to a position where the movable unit interferes with the support unit; and controlling the rotationally driving unit using the driving range, wherein the margin angle is changed according to the optical state, wherein the movable unit can change between a first state and a second state according to the optical state, wherein a distance between a center of gravity of the movable unit and a rotation center position of the rotationally driving unit when viewed from a direction parallel to a rotation axis of the rotationally driving unit in the second state is longer than that in the first state, wherein the margin angle in the first state is smaller than the margin angle in the second state, wherein the first state is a state in which the center of gravity and the rotation center position coincide with each other when viewed from the direction parallel to the rotation axis, and wherein the second state is a state in which the center of gravity is separated from the rotation center position when viewed from the direction parallel to the rotation axis.

12. A non-transitory computer-readable storage medium storing a program that causes a computer to execute the control method according to claim 11.

* * * * *